United States Patent
Barbarossa

[11] Patent Number: 6,003,222
[45] Date of Patent: Dec. 21, 1999

[54] MANUFACTURE OF TAPERED WAVEGUIDES

[75] Inventor: Giovanni Barbarossa, New Providence, N.J.

[73] Assignee: Lucent Technologies Inc., Murray Hill, N.J.

[21] Appl. No.: 08/891,439

[22] Filed: Jul. 10, 1997

[51] Int. Cl.[6] .................................................. H01P 11/00
[52] U.S. Cl. ................................................ 29/600; 385/43
[58] Field of Search .......................... 29/600; 385/43, 385/49, 14, 129, 130, 131; 343/700 MS, 701

[56] References Cited

U.S. PATENT DOCUMENTS

| | | | |
|---|---|---|---|
| 4,998,793 | 3/1991 | Henry et al. | 350/96.15 |
| 5,133,029 | 7/1992 | Baran et al. | 385/11 |
| 5,402,511 | 3/1995 | Malone et al. | 385/43 |
| 5,473,710 | 12/1995 | Jaw et al. | 385/14 |
| 5,703,974 | 12/1997 | Sasaki et al. | 385/14 |

*Primary Examiner*—Lee Young
*Assistant Examiner*—Davide Caputo

[57] ABSTRACT

The specification describes techniques for fabricating tapered waveguides in planar photonic integrated circuits with the tapers formed in the z-direction (thickness). The tapers are formed by depositing the core layer in two operations. After depositing the first core layer, the layer is masked, and a step is formed in the first layer. When the second core layer is deposited over the step, a smooth taper results. The core layers are preferably formed by flame hydrolysis. During consolidation the two core layers coalesce into a single homogeneous layer with a smooth taper in the thickness dimension of the waveguide.

16 Claims, 5 Drawing Sheets

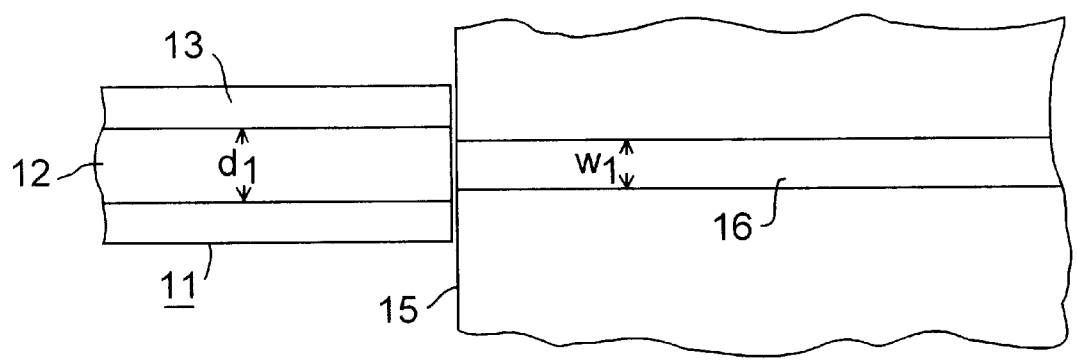
FIG. 1 (top)
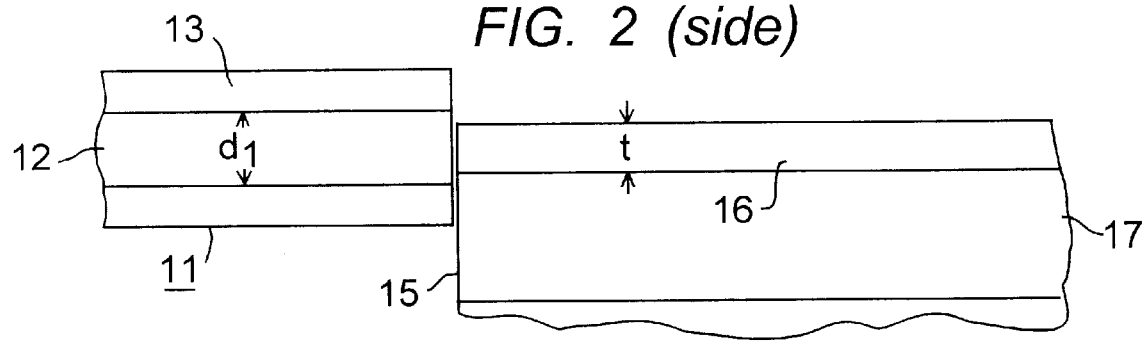
FIG. 2 (side)
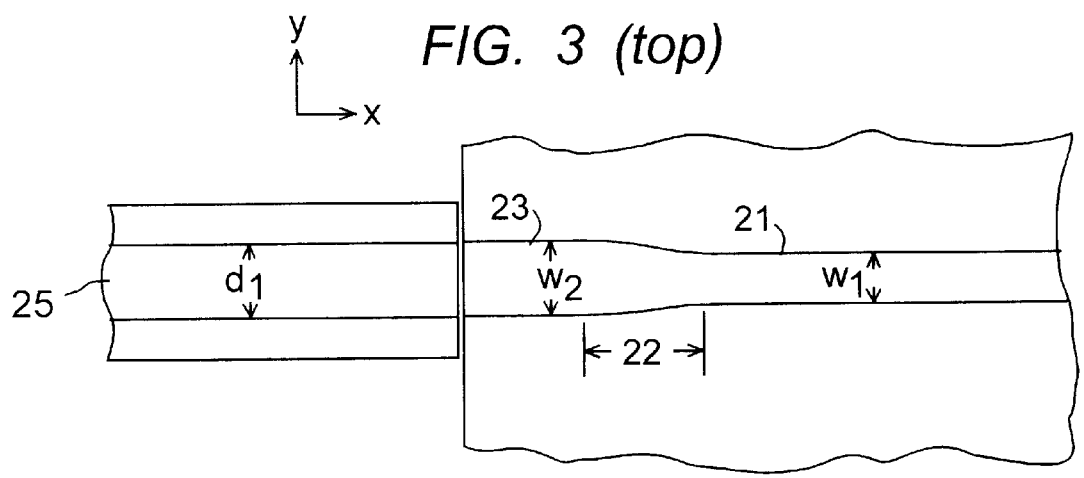
FIG. 3 (top)

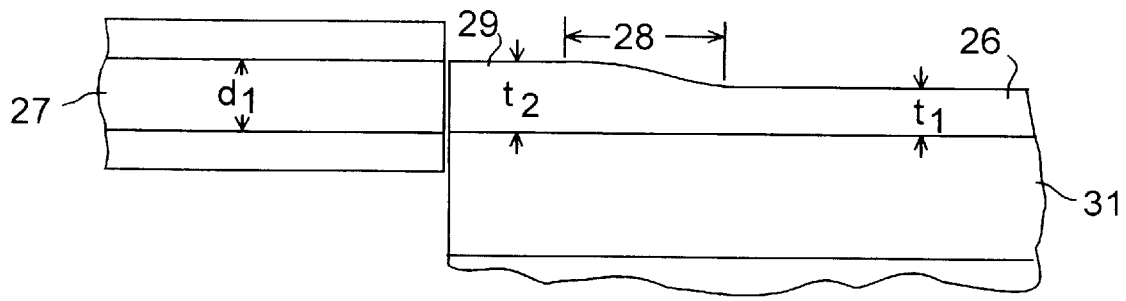
FIG. 4 (side)
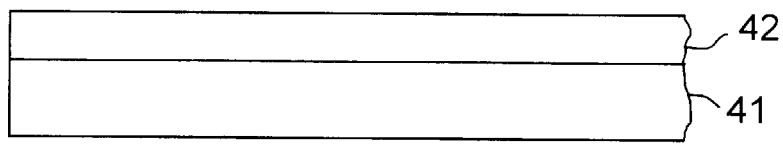
FIG. 5
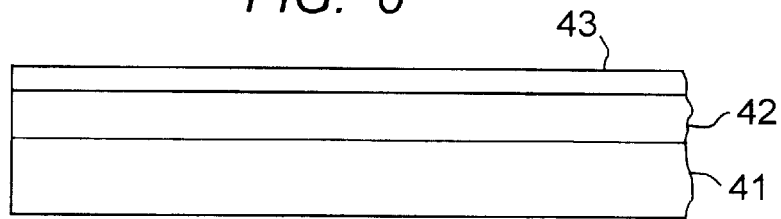
FIG. 6
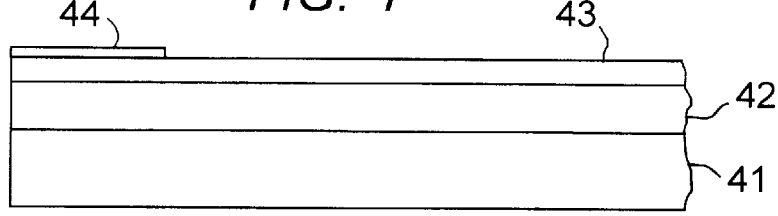
FIG. 7

MANUFACTURE OF TAPERED WAVEGUIDES

FIELD OF THE INVENTION

The invention relates to tapered waveguides for planar photonic integrated circuits, and to methods for their manufacture.

BACKGROUND OF THE INVENTION

Waveguides in photonic integrated circuits have been proposed in a variety of forms but most typically in the form of a doped core bordered on the sides and bottom by suitable cladding material. The cladding material is chosen to have a refractive index lower than that of the core thus forming a channel shaped lightguide. In most configurations an upper cladding layer is included.

A structure that has received much interest recently is patterned after the typical optical fiber structure, i.e. a doped silica core with a silica cladding, and is fabricated using techniques developed in optical fiber technology, e.g. flame hydrolysis deposition (FHD). The preferred platform or substrate for these waveguides is a silicon wafer. The compatibility between the materials of the optical fiber and the planar integrated circuit allow common processing approaches. Also, more efficient and more reliable coupling between the optical fiber input/output can be obtained with this combination due to matching of thermo-mechanical, chemical, and optical properties.

The primary goal in photonic integrated circuit technology is the same as for semiconductor technology, i.e. packing multiple elements or devices into a small space. Routing of electrical leads in semiconductor devices is relatively unconstrained since electrical runners can be made with sharp bends. In photonic integrated circuits, the allowable bending radius is an important issue because it influences strongly the possible packing density of components. In general, given a certain waveguide index step or gradient, the loss introduced in the photonic circuit by the bent portion of a waveguide increases with decreasing curvature radius. Therefore, given a certain waveguide index step or gradient, the bending radius of a waveguide is limited to a value which gives losses acceptable in the economy of the circuit. For a given loss "budget" the potential packing density of components increases if the waveguide index step or gradient increases.

In single mode photonic integrated circuits, the allowable bending radius is sensitive to the index gradient between the core and the cladding materials, and also to the size of the waveguide. In high refractive index delta waveguides the optimum core size for a single mode waveguide is significantly smaller than the core size of a typical optical fiber. This difference in core size has important implications in coupling efficiency between the core of the planar integrated circuit waveguide and the core of the input/output fiber attached to the integrated circuit. The coupling loss between the fiber and the planar IC is minimized when the mode of the optical beam is preserved, i.e. the fiber and the IC have matched optical modes. This is achieved for fiber and waveguide having the same index delta by matching the core size. Consequently, to minimize insertion loss, the generally preferred objective is to have matching core sizes. However, this appears incompatible with the other important objectives of retaining the standard core size for the optical fiber, and using a smaller core size for the planar integrated circuit.

To overcome the core size difference it has been proposed to fabricate a transitional waveguide section in the region of the planar integrated circuit at the coupling between the planar waveguide and the fiber. In this transitional section the core of the planar waveguide is tapered so that the cross section of the core of the waveguide mates closely with the cross section of the core of the fiber. Beyond the tapered section, in the direction of the planar integrated circuit, the cross section area of the core of the waveguide is reduced to satisfy the optimum dimensions for planar waveguide cores.

A planar waveguide structure designed to implement this concept is described in *Journal of Lightwave Technology*, Vol. 10, No. 5, pp. 587–591, May 1992. In this paper a technique is proposed to taper the core of the planar waveguide using flame hydrolysis deposition (FHD). After deposition of the cladding layer on the substrate in the normal way, the core is created by scanning the substrate with the FHD flame while modulating the composition of the gases being fed to the torch, thus changing the composition of the deposited material in the scanning direction. Either the torch or the substrate can be physically moved, and the scanning direction is consistent in a single x-y-direction, i.e. it scans in only in the direction parallel to the waveguide being tapered. In theory, one could scan in the other direction, i.e. normal to the waveguide, but that would require more control than is allowed by the usual dynamic range of the process. In the manner described, longitudinal composition gradients, and corresponding index gradients, can be used to form the desired taper in the x-y plane of the planar waveguide, i.e. to taper the width of the waveguide. In a similar manner, but using a control program based on point-to-point layer composition, control of the composition in three dimensions can be achieved and the effective cross section of the waveguide can be tapered in both the x-y plane and the z-(thickness) direction. The capability of tapering in the z-direction is the desirable feature of this process since tapering in the x-y plane can easily be achieved using a conventional mask. However, in practice the technique is limited to producing tapers in one x-y direction only, due to the relatively limited dynamic range over distance of the compositional changes or the deposition mass flow rate that are obtainable with the technique. Moreover, the goal of tapering in the z-direction is achieved in this technique only with substantial process complexity and cost. A simpler and more cost effective method for tapering planar waveguides would be desirable, especially one which has no constraints on the direction(s) of the taper in the x-y plane, and which can produce relatively abrupt tapers at any position(s) in the photonic IC.

SUMMARY OF THE INVENTION

I have developed a technique for tapering planar waveguides which is relatively simple, and has proven effective for achieving z-direction tapering without the process complexity of the prior art. It is based on the recognition that if a core layer is formed over a step by FHD, and then consolidated, a layer with a gentle taper over the step results. This principle can be implemented by depositing the core layer in two steps. A first core layer is deposited, and the step is etched in the first core layer. Thereafter a second core layer is deposited so as to extend over the step in the first core layer, and the composite body is annealed. Upon consolidation, the second core layer freely flows by surface tension and the two core layers merge as one. The resulting core layer has a gentle taper where the second layer was formed over the step in the first layer. Since the step can be made with any x-y shape, a corresponding taper can be made in any desired geometry, e.g. in two x-y directions. This allows tapering to produce expanded waveguide sections for waveguide crossovers, and reduced thickness waveguide sections advantageous for, e.g., star couplers.

BRIEF DESCRIPTION OF THE DRAWING

FIGS. 1 and 2 are schematic diagrams in plan view (FIG. 1) and side view (FIG. 2) of a coupling between a planar integrated circuit and an optical fiber, showing the mismatch in the core on either side of the coupling;

FIGS. 3 and 4 are views similar to those of FIGS. 1 and 2 showing in concept the use of tapered waveguide sections to overcome the core mismatch;

FIGS. 5–11 show a sequence of process steps useful for fabricating the tapered waveguide sections of FIGS. 3 and 4;

DETAILED DESCRIPTION

Figure 8:
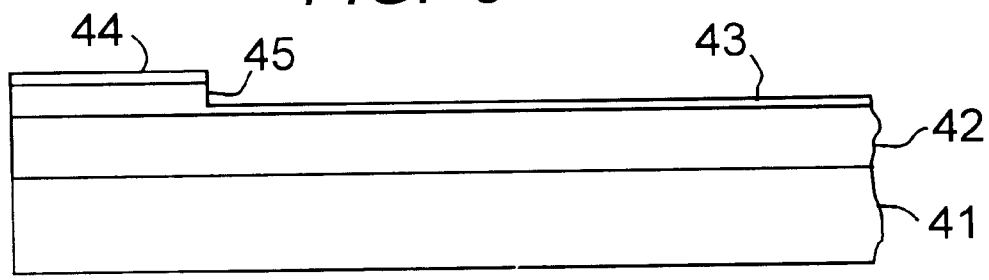

Referring to FIG. 1, a conventional optical fiber is shown at 11 with fiber core 12 and cladding 13. As will be recognized by those in the art the dimensions in this and subsequent figures are for illustrative purposes and not to scale. Typical fiber dimensions are 5–10 microns for the diameter, $d_1$ of the core 12, and 120–140 microns for the overall diameter of the core 12 and cladding layer 13. The fiber coating is not shown and in the usual case has been stripped so as to facilitate attachment of the fiber to the integrated circuit.

A cutaway portion of a photonic planar integrated circuit is shown with host substrate 15, planar waveguide 16, and a lower cladding layer 17. As described earlier, the typical width of the planar waveguide, $w_1$, is less than $d_1$. For example, planar waveguide 16 can be essentially square in shape with 4.5 micron sides, and the fiber core 12, typically circular in cross section, has a diameter $d_1$ of 6.8 microns. The mismatch of the optical fiber core to the planar waveguide core in this case is approximately 50%. A mismatch of 10% or more gives sufficient loss that techniques for improving the match, like those to be described below, will be considered useful by those in the art.

In FIG. 3, which is a plan view similar to that of FIG. 1, the planar waveguide 21 with optimum width $w_1$ is shown having a tapered section 22, so that the width, $w_2$, of the planar waveguide section 23 beyond the taper, now matches the diameter $d_1$ of the fiber core 25. The mismatch between the planar waveguide 26 and the fiber core 27 in the z-direction is seen in the side view of FIG. 4, and is addressed by tapered section 28. In this embodiment the slope of the tapers in both the y-direction and the z-direction are the same, and if $W_1$ and $t_1$ are approximately the same, and $w_2$ and $t_2$ are also approximately the same, the length of the z-direction taper 28 is approximately twice the length of the y-direction taper 22. In a preferred embodiment the slope of the taper 28 is increased to that of taper 22 to shorten the length of the tapered section. The preferred taper length taper length for either direction is in the range 0.1–2 mm, and the optimum range is 0.2–1.4 mm. The planar waveguide section 29, after the tapered section 28, has a core depth, or thickness, $t_2$ that essentially matches the diameter $d_1$ of the fiber core.

The taper, expressed in percent, is defined as:

$$(t_2 - t_1)/t_1$$

and is typically greater than 10% for the invention to have practical effect, and preferably greater than 20%.

FIG. 4 describes a situation in which the primary dimensions of the core of the fiber matches those of the planar waveguide. To avoid loss in the coupling, it is desirable to have these dimensions match to within 20%, and preferably 10%, or to have the waveguide on the receiver side of the coupling larger than the waveguide on the input side of the coupling. In this context, the effective area of the planar waveguide should be equal to or larger than the fiber waveguide on the input of the device, with the reverse relationship on the output. This can be accomplished easily, using the technique of the invention, by tapering the planar waveguide at the input, and either not tapering the waveguide at the output, or using a smaller taper at the output.

In the embodiment shown in these figures the planar waveguide core is shown at the surface of the integrated circuit. It is generally advantageous to add an upper cladding layer so that the core of the planar waveguide is buried in the structure.

The technique of the invention for making the tapered sections shown in FIGS. 3 and 4 will be described in conjunction with FIGS. 5–11. Referring to FIG. 5, the photonic integrated circuit substrate is shown at 41, with lower cladding layer 42. The preferred substrate is a silicon wafer. Alternative substrates are $Al_2O_3$, $Be_2O_3$, BN, silica, and various suitable ceramics. Silicon is preferred in part because cladding layer 42 can be thermally grown. It also has good thermal and electrical properties, good environmental stability and low toxicity, good mechanical stability, synergy with integrated circuit manufacture, is relatively inexpensive, and can be produced with exceptional flatness ($\lambda/4$) over large areas (e.g. 8 in.) A convenient alternative is to use a silica substrate, in which case the silica substrate can also function as the lower cladding layer for the waveguide.

Techniques for depositing layer 42, such as FHD, CVD, etc. are suitable, and other stable cladding materials can be substituted for $SiO_2$. The thickness of the cladding layer 42 is typically in the range 5–50 microns. The refractive index of thermal $SiO_2$ is 1.4578 at a wavelength of 0.6328 $\mu$m (He—Ne laser).

As indicated above, the core for the planar integrated circuit is formed in two steps, using two layers. The first core layer 43 is shown in FIG. 6 and comprises a material with a refractive index larger than that of the cladding layer 42, e.g. 0.4% larger, which allows a bending radius of approximately 10 mm, or 1.2% larger, which allows a bending radius of about 3 mm. The material of the core is preferably doped silica, to substantially match the thermal expansion and chemical properties of the cladding layer. Typical dopants are oxides of e.g. germanium, boron, phosphorus, titanium. Preparation methods for doped layers of the kind required for this invention are well known. For example, see M. Kawachi, "Silica waveguides on silicon and their application to integrated-optic components", *Optical and Quantum Electronics*, Vol. 22, pp. 391–416, 1990. It is preferred that the core layers described herein be formed by FHD techniques as these are both well developed and particular useful for the preferred silica based materials. If layer 43 is deposited by FHD, it is consolidated after deposition by heating to a temperature above 1200° C. for 1–6 hours.

As will become evident below, the final thickness (consolidated thickness) of layer 43 determines the maximum taper thickness allowed in the process. If a taper of 20% is desired, the thickness of layer 43 must be at least 20% of the thickness $t_1$ of the final core layer. Also it will become apparent that the thickness of layer 43 will usually be larger. A preferred thickness range for layer 43 is 1–8 μm.

The step in the first core layer used to create the taper is formed in layer 43 by a suitable technique, preferably by standard photolithography. Other standard techniques can also be employed, e.g. e-beam, or x-ray lithography. The etch process can be wet or dry e.g. RIE. FIG. 7 show a photomask 44 covering a portion of layer 43, with the edge of the photomask located at the center of the position desired for the taper. The photomask is produced by the standard process of spinning a coating of photosensitive polymer on layer 43, exposing a portion (either the portion to be removed or the portion to remain) to actinic radiation, and developing the pattern. As an alternative, a hard mask of e.g., polysilicon, chrome, or Ni—Cr alloy, or other appropriate thin film material can be used. The thickness of silica that is removed in this etch step is relatively large, i.e. a few microns. It is well known that the etch selectivity in such a case may not be adequate to ensure etching through the layer without destruction of the mask. The standard procedure in such a case is to use a hard mask or multilevel resist, especially if dry etching is used. Using HF, the additional steps required for a hard mask may not be required.

In the embodiment being described, in which the core of a planar waveguide is coupled to the core of an optical fiber, the taper will be formed close to the ultimate edge of the integrated circuit chip. In other embodiments to be described below the taper is formed in the interior of the integrated circuit, and multiple tapers in more than one x- or y-direction can be formed.

With the photomask or hard mask in place, the exposed regions of layer 43 are etched as shown in FIG. 8 to form step 45. The depth of the etch determines the height of the step, and the degree of taper in the final core. For a 20% taper, the step should have a height of at least 20% of $t_1$. If $t_1$ is to be 4.5 microns, in the example given earlier, the step height should be approximately 0.9 microns. For a 40% taper, which is preferred if the core dimension $t_2$ is to match the fiber core diameter $d_1$ in the example given above, the step height should be at least 1.8 microns. The step height also determines the length of the tapered section. Using the dimensions given in the examples in this description, the taper length is within the preferred 0.1–2.0 mm range. Typically, for the applications described herein, the step height will be at least 1 μm.

In the preferred process sequence, the thickness of layer 43 is made equal to the desired step height, and layer 43 is etched through its thickness to form step 45. In the process step illustrated in FIG. 8, the thickness of layer 43 is greater than the thickness desired for the step height, and the etch proceeds partially through the thickness of layer 43. In the embodiment shown, a wet etch, aqueous HF, 5 parts water to one part 49% HF , was used to create the step. The etch process used is not critical and dry etch techniques can be used as well. It will become evident that the step may itself be tapered, as results from an isotropic plasma etch, or a wet etch such as diluted or concentrated HF. Because the dimensions involved in this process are relatively large by silicon processing standards, the usual precision for linewidth control, etch depth, sidewall geometry, undercut, etc. is not required.

Figure 9:
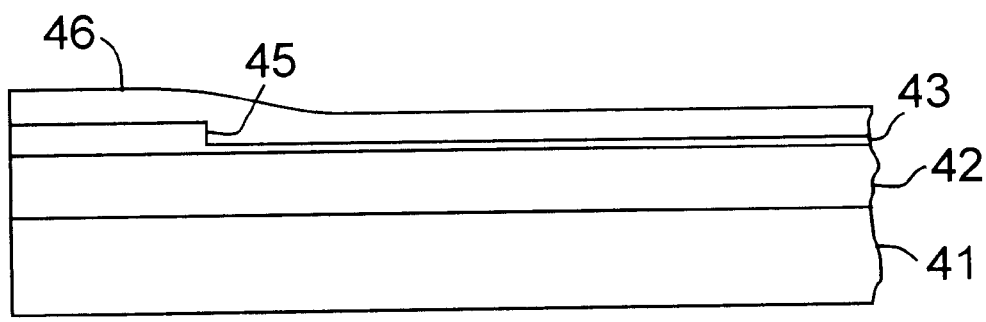
Figure 10:
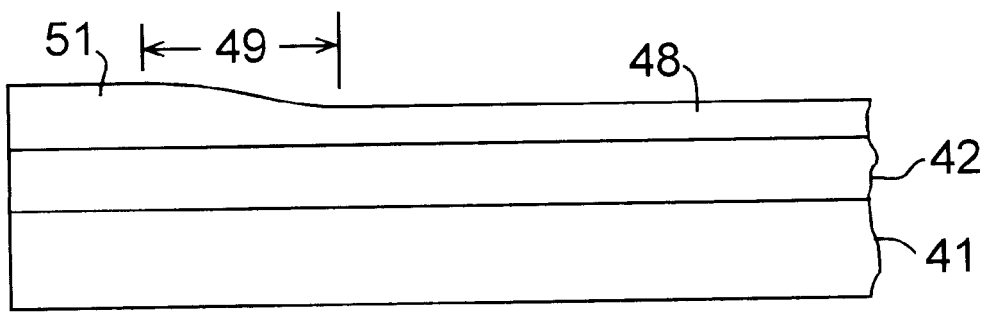
Figure 11:
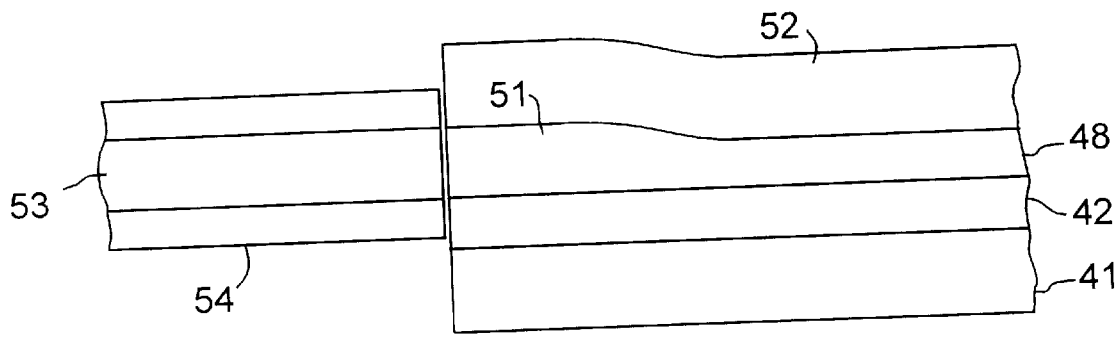

In the next step, illustrated in FIG. 9, the second core layer 46 is deposited. The thickness of layer 46 should be equal to $t_2$ minus the thickness of layer 43. It also should be at least comparable to the thickness of the step height, i.e. at least 75% of the step height. If deposited by FHD, layer 46 is consolidated by heating to a temperature >1050° C. for 1–6 hours. During this step the two core layers coalesce to a single, homogeneous core layer 48 as shown in FIG. 10, with a tapered section 49 making a smooth waveguide transition between the planar waveguide core 51 and the core of the optical fiber. The upper cladding layer 52 is then formed as shown in FIG. 11 to complete the planar waveguide. This cladding layer may be essentially the same as the lower cladding layer 42. In FIG. 11 fiber 54 is shown with fiber core 53 aligned to the expanded core 51 of the planar waveguide. Attachment of the fiber to the planar waveguide is done by standard procedures. The fiber is typically attached using an adhesive such as epoxy.

It is evident from FIG. 9 that the step 45 in layer 43 can be steep, or can itself be tapered to add smoothness to the taper 49. An option in the process is to smooth the step prior to depositing the second core layer by heating layer 43 to its softening temperature. If layer 43 is formed by FHD, the step can be smoothed during the consolidation step.

After completing the core layer, with an appropriate taper in the z-direction (thickness), the taper in the x-y plane is formed by suitable lithography. Alternatively, the taper in the x-y plane can be formed during deposition of the two core layers using the technique described in the patent referenced above.

The effectiveness of the process described above for forming waveguide layers with tapers in the z-direction was demonstrated by the following example.

EXAMPLE

A 15 μm thick silicon dioxide lower cladding layer was thermally grown on a silicon wafer. The cladding layer had a refractive index of 1.4578 at a wavelength of 0.6328 microns. The first core layer was deposited by FHD on the cladding layer. The first core layer was 4.5 microns thick with composition: $79SiO_2$—$12GeO_2$—$8B_2O_3$—$1P_2O_5$, and an index delta of 1.2%. The first core layer was heated to 1320° C. for 2 hours to consolidate the layer, and then masked with a photomask. The exposed regions were etched using a solution of 5 parts water to 1 part 49% HF to a depth of 2.5 μm. The photomask was removed, and the second core layer was deposited. The second core layer had the same composition and refractive index as the first core layer, and a thickness of 2.5 μm. The second layer was then consolidated in the same manner as the first and the two core layer coalesced together. The resulting structure had a tapered core layer with a taper in the vertical or z-axis dimension of approximately 55%.

Figure 12:
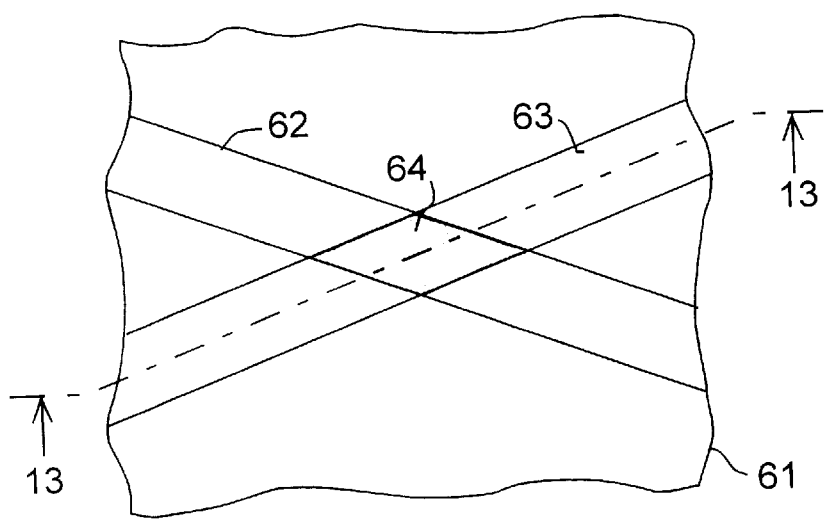
FIG. 12 is a schematic view of one device application for the process of the invention.
Figure 13:
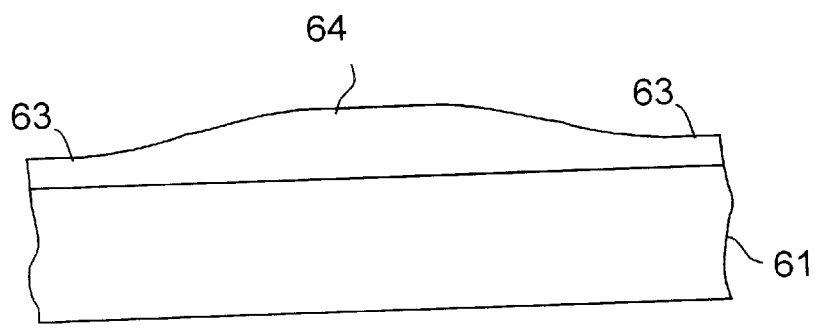
FIG. 13 is a section through 13—13 of FIG. 12.

As mentioned earlier, an important advantage of the technique of the invention is that it can be used to form tapers along more than one x- or y-direction. An embodiment demonstrating this is shown in FIGS. 12 and 13. FIG. 12 shows an interior portion 61 of a planar integrated circuit in which two waveguides 62 and 63 cross over. In the crossover region 64, each of the waveguides sees a gap, equal to the width of the other waveguide, where there is no lateral confinement in the x-y plane. It is known that losses in both waveguides in the crossover region can be reduced if the waveguide in the crossover region is expanded in size. The tapering technique of the invention allows this expansion to be achieved by depositing the core layer in two operations, and providing steps in the first core layer at the boundaries of the crossover using the technique described above. After deposition of the second core layer, tapers are formed in the two x-y directions near the boundary of the crossover region. The result is shown in FIG. 13, which is a section through 13—13 of FIG. 12 and shows the expanded waveguide in the crossover region 64.

In the embodiment of FIGS. 12 and 13 the waveguides cross at an acute angle. The invention can be applied to waveguides crossing at any angle. The losses in a crossover increase with decreasing crossing angle, so the invention confers substantial benefits with crossovers at very acute angles, e.g. 10°. However, crossovers at e.g. right angles may also benefit from the waveguide tapering technique of the invention.

Figure 14:
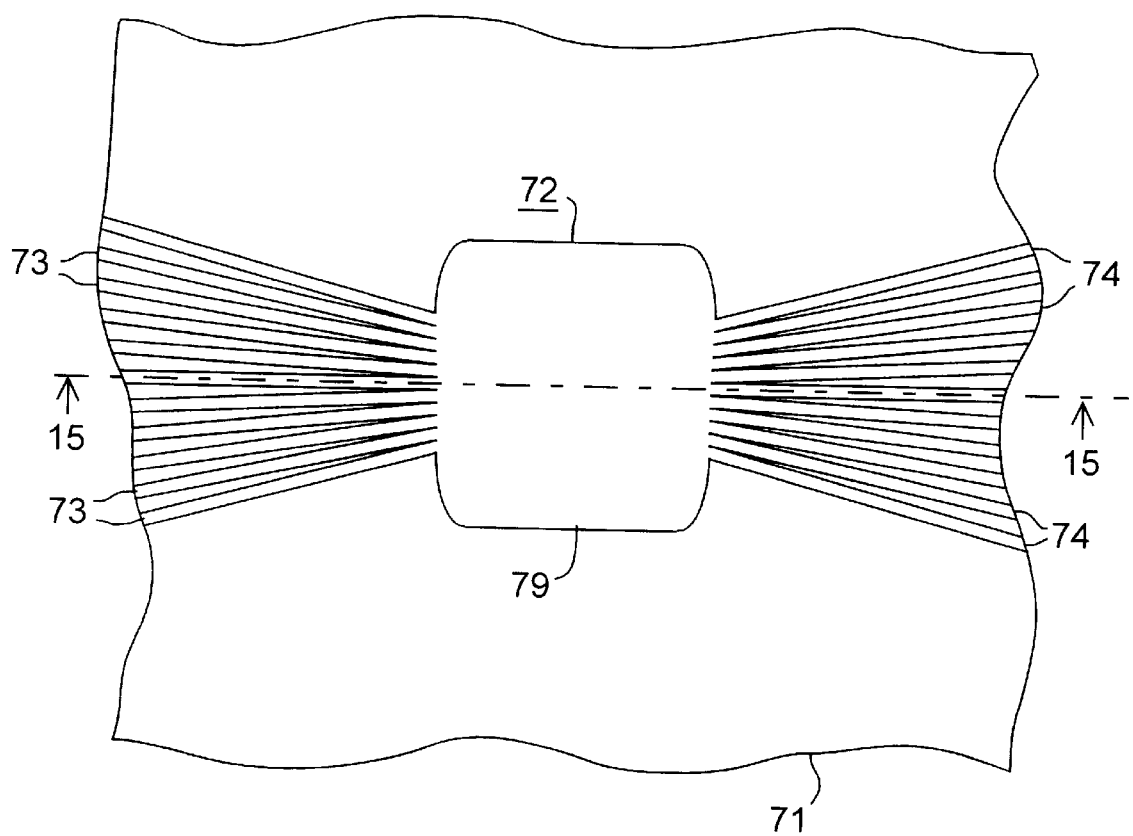
FIG. 14 is a schematic view of another device application for the process of the invention.
Figure 15:
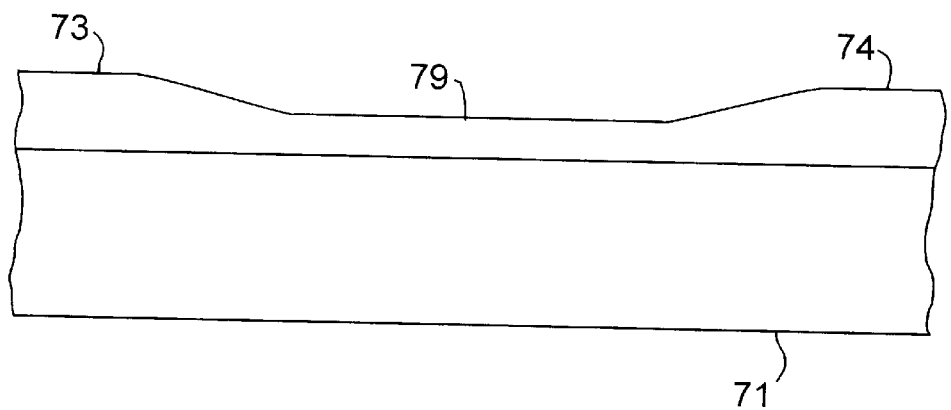
FIG. 15 is a section through 15—15 of FIG. 14.

Another embodiment in which tapered waveguides in more than one x- or y-direction are useful is illustrated in FIGS. 14 and 15. FIG. 14 shows a plan view of an interior portion 71 of a planar integrated circuit which contains a star coupler 72, a device well known in the art. The star coupler has two sets of waveguides 73 and 74 potentially coupled through waveguide slab region 79. For efficient operation of a star coupler, the guiding of modes in the coupler region 79 are preferably more confined than in the waveguides 73–74. Therefore, a waveguide slab thinner than the channel waveguides is desirable. This can be effectively achieved without incurring loss at the thickness transition using the tapering process of the invention by depositing the waveguide core in two operations and providing suitable steps where the tapers are desired. The result is illustrated in FIG. 15 which is a section through 15—15 of FIG. 14, and shows the narrowed waveguide in the waveguide slab region 79.

It is evident from FIGS. 12–15 that the method of the invention is capable of forming tapered waveguide sections in any desired direction or in multiple directions in the x-y plane. For example, in the structure shown in FIG. 14 the tapered sections are oriented in a variety of x-y directions, and the series of tapers along each set of waveguides 73 and 74 are oriented along a curved path as shown.

Various additional modifications of this invention will occur to those skilled in the art. All deviations from the specific teachings of this specification that basically rely on the principles and their equivalents through which the art has been advanced are properly considered within the scope of the invention as described and claimed.

I claim:

1. Method for fabricating a waveguide in a planar photonic integrated circuit wherein the waveguide comprises a cladding and a core, wherein the thickness of the core of the waveguide is tapered, and the core consists essentially of a single material, the method comprising the steps of:
   a. forming a cladding layer on a substrate,
   b. forming a first portion of said core layer on the cladding layer, said first portion of said core layer consisting essentially of an optically transparent material,
   c. forming a step in said first portion of said core layer,
   d. forming a second portion of said core layer over the first portion of the core layer and extending over the said step, said second portion of the core layer consisting essentially of the same optically transparent material as said first portion of said core layer, thereby forming a taper in the core of the waveguide.

2. The method of claim 1 wherein the substrate is selected from the group consisting of alumina, silica and silicon.

3. The method of claim 2 wherein the substrate is silicon and the first cladding layer comprises $SiO_2$.

4. The method of claim 3 including the step of thermally growing the $SiO_2$ layer.

5. The method of claim 2 in which the first and second core layers comprise doped silica.

6. The method of claim 1 further including the step of attaching an optical fiber to the planar integrated circuit with said optical fiber aligned to the taper in the core of the waveguide.

7. Method for fabricating a waveguide in a planar photonic integrated circuit wherein the waveguide comprises a cladding and a core, and wherein the thickness of the core of the waveguide is tapered, the method comprising the steps of:
   a. growing an $SiO_2$ cladding layer on a silicon substrate,
   b. depositing by flame hydrolysis deposition a first core layer on said cladding layer, said first core layer comprising doped silica and having a thickness in the range of 1–8 $\mu$m,
   c. consolidating said first core layer by heating the layer to a temperature in excess of 1050° C.,
   d. masking a portion of said first core layer,
   e. etching away exposed portions of said first core layer to a depth of at least 1 $\mu$m to form a step in said first core layer,
   f. depositing a second core layer of doped silica, with a doped silica composition essentially the same as the composition of said first core layer, said second core layer having a thickness of at least 1 $\mu$m, and said second core layer extending over the said step in said first core layer, and
   g. consolidating said second core layer by heating the layer to a temperature in excess of 1050° C. thereby forming a homogeneous core layer with a tapered thickness.

8. The method of claim 1 wherein the said step comprises at least two sections, a first section extending in one x-y direction and a second section extending in a second x-y direction.

9. The method of claim 8 in which the said first and second x-y directions are different by at least approximately 10°.

10. The method of claim 7 in which after step e, the step is heated to at least its softening temperature to smooth the step.

11. Method for fabricating a waveguide in a planar photonic integrated circuit wherein the waveguide comprises an upper cladding and a core formed on a silica substrate, and wherein the thickness of the core of the waveguide is tapered, the method comprising the steps of:
   a. depositing by flame hydrolysis deposition a first core layer on said substrate, said first core layer comprising doped silica and having a thickness in the range of 1–8 $\mu$m,
   b. consolidating said first core layer by heating the layer to a temperature in excess of 1050° C.,
   c. masking a portion of said first core layer,
   e. etching away exposed portions of said first core layer to a depth of at least 1 $\mu$m to form a step in said first core layer,
   f. depositing a second core layer of doped silica, with a doped silica composition essentially the same as the composition of said first core layer, said second core layer having a thickness of at least 1 $\mu$m, and said second core layer extending over the said step in said first core layer, and
   g. consolidating said second core layer by heating the layer to a temperature in excess of 1050° C. thereby forming a homogeneous core layer with a tapered thickness, and
   h. depositing an upper cladding layer over the second core layer.

12. Method for fabricating an optical assembly comprising a waveguide in a planar photonic integrated circuit and an optical fiber connected to said waveguide, wherein both the waveguide and the optical fiber comprise a cladding and a core, wherein the thickness of the core of the waveguide is tapered, and the core consists essentially of a single material, the method comprising the steps of:

a. forming a cladding layer on a substrate, b. forming a first portion of the core layer on the cladding layer, said first portion of the core layer consisting essentially of said single material, c. forming a step in said first core layer, d. forming a second portion of the core layer over the first portion of the core layer and extending over the said step, said second portion of the core layer consisting essentially of said single material, thereby forming a taper in the core of the waveguide, and e. attaching said optical fiber to said waveguide with the core of said optical fiber aligned to said taper in the core of the waveguide.

13. The method of claim 12 wherein the substrate is selected from the group consisting of alumina, silica and silicon.

14. The method of claim 13 wherein the substrate is silicon and the first cladding layer comprises $SiO_2$.

15. The method of claim 14 including the step of thermally growing the $SiO_2$ layer.

16. The method of claim 13 in which the first and second core layers comprise doped silica.

* * * * *